US012570095B2

(12) United States Patent
Kim

(10) Patent No.: US 12,570,095 B2
(45) Date of Patent: Mar. 10, 2026

(54) PRINTING SYSTEM AND PRINTING METHOD

(71) Applicant: Samsung Display Co., Ltd., Yongin-Si (KR)

(72) Inventor: Eunseok Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 184 days.

(21) Appl. No.: 18/607,549

(22) Filed: Mar. 18, 2024

(65) Prior Publication Data

US 2024/0316956 A1 Sep. 26, 2024

(30) Foreign Application Priority Data

Mar. 24, 2023 (KR) ........................ 10-2023-0038978
Jun. 15, 2023 (KR) ........................ 10-2023-0077060

(51) Int. Cl.
*B41J 2/175* (2006.01)
*B41J 11/00* (2006.01)
*B41J 29/26* (2006.01)

(52) U.S. Cl.
CPC ....... *B41J 11/0045* (2013.01); *B41J 2/17596* (2013.01); *B41J 29/26* (2013.01); *B41J 2203/01* (2020.08)

(58) Field of Classification Search
CPC .... B41J 3/407; B41J 11/0045; B41J 11/0065; B41J 11/008; B41J 11/04505; B41J 29/26; B41J 29/36; B41J 29/42; B41J 2203/01
See application file for complete search history.

(56) References Cited

U.S. PATENT DOCUMENTS

| | | | | |
|---|---|---|---|---|
| 11,161,341 | B2 | 11/2021 | Min et al. | |
| 2015/0165803 | A1* | 6/2015 | Misumi | B41J 29/38 347/19 |
| 2020/0039262 | A1* | 2/2020 | Hirai | B41J 29/393 |
| 2020/0070504 | A1* | 3/2020 | Kawatoko | B41J 2/155 |
| 2023/0148067 | A1 | 5/2023 | Han et al. | |
| 2023/0166525 | A1* | 6/2023 | Arazaki | B41J 2/2132 347/14 |

(Continued)

FOREIGN PATENT DOCUMENTS

| | | | |
|---|---|---|---|
| CN | 112046149 | A | 12/2020 |
| CN | 218333832 | U | 1/2023 |
| JP | 2019-211214 | A | 12/2019 |

(Continued)

*Primary Examiner* — Anh T Vo
(74) *Attorney, Agent, or Firm* — Innovation Counsel LLP

(57) ABSTRACT

A printing system may include a printing module, a measurement device, and a correction device. The printing module performs printing processes on a substrate. The printing processes include a first printing process based on a first pulse number. The measurement device may obtain image data for the substrate before and after the first printing process. The correction device may use the image data to obtain information indicating a change in a separation between first and second reference marks on the substrate before and after the first printing process. The correction device may then determine a second pulse number based on the information and control the printing module to perform a second printing process that is based on the second pulse number.

20 Claims, 12 Drawing Sheets

(56) References Cited

U.S. PATENT DOCUMENTS

2023/0226824 A1 7/2023 Han et al.

FOREIGN PATENT DOCUMENTS

| | | | |
|---|---|---|---|
| KR | 10-2012-0106536 | A | 9/2012 |
| KR | 10-2015-0138180 | A | 12/2015 |
| KR | 10-2020-0140962 | A | 12/2020 |
| KR | 10-2023-0033233 | A | 3/2023 |
| KR | 10-2023-0033781 | A | 3/2023 |
| KR | 10-2023-0067742 | A | 5/2023 |
| KR | 10-2023-0111713 | A | 7/2023 |
| KR | 10-2023-0140676 | A | 10/2023 |

* cited by examiner

PRINTING SYSTEM AND PRINTING METHOD

CROSS-REFERENCE TO RELATED APPLICATION

This application is based on and claims priority under 35 U.S.C. § 119 to Korean Patent Application No. 10-2023-0038978, filed on Mar. 24, 2023, and Korean Patent Application No. 10-2023-0077060, filed on Jun. 15, 2023, in the Korean Intellectual Property Office, the disclosures of which are incorporated by reference herein in their entirety.

BACKGROUND

1. Field

One or more embodiments relate to printing systems and printing methods, and more particularly, to a printing system and printing method capable of performing precise printing by compensating for thermal deformation of a substrate.

2. Description of the Related Art

Industrial inkjet printers use, as printing solutions, metal materials (such as, copper, gold, and silver), ceramics, and polymers as well as general dyes. Such inkjet printers are used in the fields of industrial graphics, displays, solar cells, etc. for directly printing on various objects such as substrates, films, fabrics, and displays. In particular, in the display field, a process using an inkjet printer may be applied to color filter manufacturing, liquid crystal alignment processes, organic emission layer manufacturing, and quantum dot emission layer manufacturing.

An inkjet printing device generally includes an inkjet printing head including at least one ink transfer passage (or nozzle). The inkjet printing head may have a higher temperature than its surroundings during a printing process. Accordingly, the heat generated by the inkjet printing head may cause problems in the reliability or accuracy of a printing process.

SUMMARY

One or more embodiments include a printing system and a printing method capable of performing precise printing by detecting and compensating for thermal deformation of a substrate. However, aspects of embodiments are not limited thereto, and the above characteristics do not limit the scope of embodiments according to the disclosure.

Additional aspects will be set forth in portion in the description which follows and, in part, will be apparent from the description, or may be learned by practice of the presented embodiments of the disclosure.

According to one or more embodiments, a printing system prints on an upper surface of a substrate on which at least a first reference mark and a second reference mark spaced apart from the first reference mark are disposed. The printing system may include a printing module, a measurement device, and a correction device. The printing module may be configured to perform a plurality of printing processes on the upper surface of the substrate. The printing processes include a first printing process that is based on a first pulse number. The measurement device may be configured to obtain image data for the upper surface of the substrate before and after the first printing process. The correction device may be configured to, based on the image data, obtain first distance change information indicating a change in the separation between the first reference mark and the second reference mark before and after the first printing process, change the first pulse number to a second pulse number, based on the first distance change information, and control the printing module to perform a second printing process of the plurality of printing processes on the upper surface of the substrate, the second printing process being based on the second pulse number.

The printing module may include a driving device that moves the substrate, based on the first pulse number for the first printing process or the second pulse number for the second printing process, and a discharge head unit configured to discharge ink to the upper surface of the substrate, the discharge of the ink being based on a first cycle obtained based on the first pulse number or a second cycle obtained based on the second pulse number.

The first distance change information may be information about a difference between a 1-1 distance between the first reference mark and the second reference mark before the first printing process, and a 1-2 distance between the first reference mark and the second reference mark after the first printing process.

The second pulse number may be increased to be greater than the first pulse number in response to the difference between the 1-2 distance being greater than the 1-1 distance.

The second cycle may be longer than the first cycle, based on a difference between the first pulse number and the second pulse number.

The first distance change information may indicate a degree of deformation of the substrate due to heat generated in the first printing process.

The correction device may be further configured to obtain a 1-3 distance between the first reference mark and the second reference mark, after the second printing process, obtain a third pulse number by correcting the second pulse number based on the 1-3 distance, and control the printing module to perform a third printing process on the upper surface of the substrate based on the third pulse number.

The correction device may be further configured to obtain a 1-4 distance between the first reference mark and the second reference mark, after the third printing process, obtain a fourth pulse number by correcting the third pulse number based on the 1-4 distance, and control the printing module to perform a fourth printing process on the upper surface of the substrate based on the fourth pulse number.

According to one or more embodiments, a printing method includes obtaining a 1-1 distance between a first reference mark and a second reference mark disposed on an upper surface of a substrate, performing a first printing process based on a first pulse number corresponding to the 1-1 distance, obtaining a 1-2 distance between the first reference mark and the second reference mark after the first printing process, obtaining a second pulse number by correcting the first pulse number based on the 1-1 distance and the 1-2 distance, and performing a second printing process based on the second pulse number.

The performing of the first printing process may include controlling a discharge head unit to discharge ink, based on a first cycle corresponding to the first pulse number.

The performing of the second printing process may include changing a location of the substrate, based on a difference between the 1-1 distance and the 1-2 distance, and controlling a discharge head unit to discharge ink, based on a second cycle corresponding to the second pulse number.

The second pulse number may be increased to be greater than the first pulse number, based on the difference between the 1-1 distance and the 1-2 distance.

The second cycle may be longer than the first cycle, based on a difference between the first pulse number and the second pulse number.

The printing method may further include obtaining a 2-1 distance between a third reference mark and the first reference mark disposed on the upper surface of the substrate before the first printing process and obtaining a 2-2 distance between the third reference mark and the first reference mark after the first printing process.

The performing of the second printing process may include, based on a difference between the 2-1 distance and the 2-2 distance, controlling a nozzle from which ink is discharged among a plurality of nozzles included in the discharge head unit.

The difference between the 1-1 distance and the 1-2 distance may be proportional to a degree of deformation of the substrate due to heat generated in the first printing process.

The printing method may further include obtaining a 1-3 distance between the first reference mark and the second reference mark after the second printing process, obtaining a third pulse number by correcting the second pulse number based on the 1-3 distance, and performing a third printing process based on the third pulse number.

The printing method may further include obtaining a 1-4 distance between the first reference mark and the second reference mark after the third printing process, obtaining a fourth pulse number by correcting the third pulse number based on the 1-4 distance, and performing a fourth printing process based on the fourth pulse number.

The 1-1 distance or the 1-2 distance may be obtained based on image data obtained by a measurement device.

The printing method may further include changing a location of the measurement device based on an alignment mark disposed on an upper surface of a driving stage when the substrate moves on the driving stage.

BRIEF DESCRIPTION OF THE DRAWINGS

The above and other aspects, features, and advantages of certain embodiments will be more apparent from the following description taken in conjunction with the accompanying drawings.

DETAILED DESCRIPTION

Figure 1:
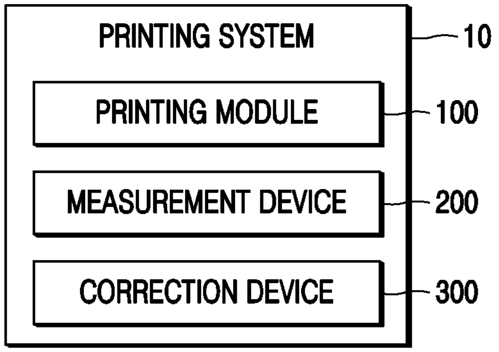
FIGS. 1 and 2 are schematic conceptual diagrams of a printing system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Hereinafter, effects and features of the disclosure and a method for accomplishing them will be described more fully with reference to the accompanying drawings, in which embodiments of the disclosure are shown. The disclosure may, however, be embodied in many different forms and should not be construed as limited to the embodiments set forth herein.

One or more embodiments will be described below in more detail with reference to the accompanying drawings. Those components that are the same as or are in correspondence with each other are rendered the same reference numeral regardless of the figure number, and redundant explanations are omitted.

It will be understood that, unless otherwise specified, when an element such as a layer, film, region or substrate is referred to as being "on" another element, it can be "directly" on the other element or intervening elements may also be present. In the drawings, the thicknesses of layers and regions may be exaggerated or reduced for convenience of explanation. For example, since sizes and thicknesses of components in the drawings are arbitrarily illustrated for convenience of explanation, embodiments are not limited thereto.

In the following examples, the x-axis, the y-axis and the z-axis are not limited to three axes of a rectangular coordinate system and may be interpreted in a broader sense. For example, the x-axis, the y-axis, and the z-axis may be perpendicular to one another or may represent different directions that are not perpendicular to one another.

A printing system according to an embodiment will be described in detail based on the above-described matters.

Figure 2:
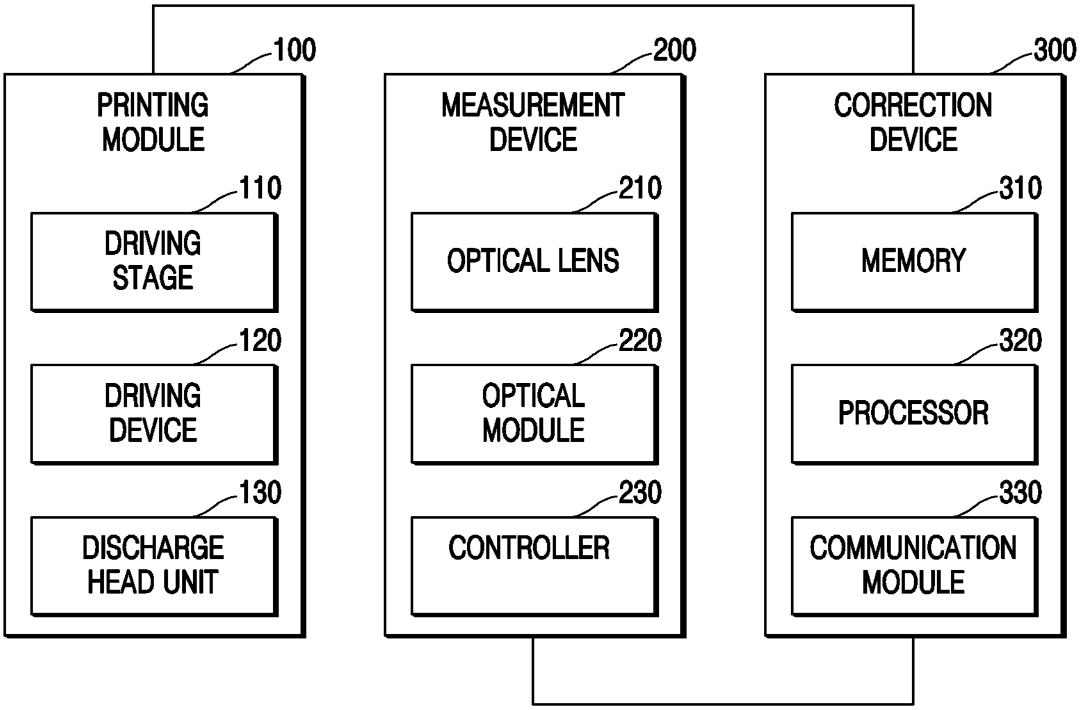

FIGS. 1 and 2 are conceptual block diagrams of a printing system according to an embodiment.

A printing system 10 according to an embodiment may be a system for printing a pattern of a preset shape on a substrate or for precisely arranging a specific material at predetermined locations. The specific material may be an ink material discharged through the printing system 10. For example, when a light-emitting material for an organic light-emitting display device is used as an ink material, the printing system 10 according to an embodiment prints the light emitting material at predetermined locations on the substrate according to a pre-determined pixel design drawing or pattern. As a result, a pixel structure according to the pre-determined pixel design drawing may be disposed on the substrate.

Referring to FIGS. 1 and 2, the printing system 10 according to an embodiment may include a printing module 100, a measurement device 200, and a correction device 300.

The printing system 10 according to an embodiment may obtain information about whether the substrate is expanded and the degree of expansion, based on at least one fiducial mark on the substrate. For example, the printing system 10 may measure or detect a change in a distance between two fiducial marks and thereby may obtain information about whether the substrate is expanded and the degree of expansion, based on the measured or detected change in the distance.

The printing system 10 can use the information about whether the substrate is expanded and the degree of expansion to change printing parameters. For example, the printing system 10 may adjust or correct an interval or cycle for discharge of the ink material, based on the obtained information about whether the substrate is expanded and the degree of expansion. As a result, printing reliability and accuracy according to the expansion of the substrate may be improved.

The printing system 10 may perform a printing process of discharging an ink material onto an upper surface of the substrate on which at least a first fiducial or reference mark (see M1 in FIG. 3) and a second fiducial or reference mark (see M2 in FIG. 3) spaced apart from the first fiducial or reference mark M1 are disposed, and the printing system may print a pre-determined shape by discharging the ink material onto the upper surface of the substrate through the printing process.

The printing module 100 may be configured to discharge the ink material onto the substrate. The printing module 100 may be controlled by the correction device 300 to be described later. The printing module 100 may operate or be driven based on pulse number information received from the correction device 300. For example, the printing module 100, when performing a printing process on the upper surface of the substrate, may use the pulse number information to adjust the printing process as needed to compensate for substrate expansion.

The pulse number information may refer to a number of pulses repeatedly transmitted within a certain period of time. The printing module 100 may discharge the ink material based on the pulse number information. For example, as the size or absolute value of the number of pulses of the pulse number information transmitted to the printing module 100 increases, the printing module 100 may increase a time during which the ink material is discharged or may otherwise extend the size of a pattern being printed. The printing module 100 may print a larger number of pixels within a certain interval when receiving a larger number of pulses and may print fewer pixels within the certain interval when receiving a smaller number of pulses.

The measurement device 200 may be disposed on the substrate and obtain image data representing one or more images including fiducial marks on the substrate. The measurement device 200 may be controlled by the correction device 300 and may transmit the obtained image data to the correction device 300. For example, the measurement device 200 may be a photographing device such as a camera that captures images using visible light, infrared light, ultraviolet light, or X-rays. In an embodiment, the measurement device 200 may obtain image data by photographing the upper surface of the substrate before/after a first printing process. The obtained image data may be transmitted to the correction device 300.

The correction device 300 may control the components constituting the printing system 10. The correction device 300 may receive a user input and may control the components constituting the printing system 10 based on the received user input. For example, the correction device 300 may be a control device that generates an instruction for controlling other components and may perform a calculation necessary for an operation according to a preset instruction and according to the measurements of the substrate.

The correction device 300 may receive the image data from the measurement device 200 and may analyze the image data to obtain first distance change information indicating a change in the distance between the first reference mark M1 and the second reference mark M2 before/after the first printing process. The correction device 300 may change first pulse number information into second pulse number information, based on the first distance change information. The correction device 300 may then control the printing module 100 to perform a second printing process on the upper surface of the substrate, based on the second pulse number information.

Referring to FIG. 2, an embodiment of the printing module 100 may include a driving stage 110, a driving device 120, and a discharge head unit 130.

The driving stage 110 may be disposed below the substrate. For example, the driving stage 110 and the substrate may be fixed to each other, and, as the driving stage 110 moves, the substrate may move with the driving stage 110. As another example, the driving stage 110 does not move, and only the substrate disposed on the driving stage 110 may move. In detail, the substrate may be moved on the driving stage 110 by air floating technology, and the driving stage 110 may be a component for applying the air floating technology to the substrate.

The driving device 120 may move the substrate, based on the pulse number information. For example, the driving device 120 may include a motor that moves the substrate a distance determined based on the number of pulses. For example, the driving device 120 may be an air blow device that moves the substrate, based on the number of pulses. In detail, the driving device 120 may be configured to move the substrate by moving the driving stage 110 or to move only the substrate, which may be floated on the driving stage 110. During a first printing process and a second printing process, the driving device 120 may move the substrate based respectively on a first pulse number and a second pulse number, which may be different depending on the size or deformation of the substrate during the first printing process and the second printing process.

The discharge head unit 130 may include a head of an inkjet printing device. The discharge head unit 130 may include at least one nozzle for discharging an ink material. When the discharge head unit 130 includes a plurality of nozzles, the plurality of nozzles may be arranged apart from each other by a certain distance.

For example, the discharge head unit 130 may have cycles for discharge ink onto the upper surface of the substrate, and a length of a cycle may be based on a first period obtained based on the first pulse number information or a second period obtained based on the second pulse number information. The first period or the second period may be obtained by the correction device 300, and the correction device 300 may control the discharge head unit 130 according to the obtained first period or second period.

The measurement device 200 may include an optical lens 210, an optical module 220, and a controller 230. The optical lens 210 may be configured to form images of the reference marks on the substrate, and the optical module 220 may include a sensor or other component for changing optical information, e.g., the image, into electrical information. The optical module 220 may further include a mechanical component capable of moving the optical lens 210, e.g., to align the optical lens 210 with a target reference mark or to bring the reference mark into focus. The controller 230 may control the optical module 220 to move the location of the optical lens 210. The controller 230 may also transmit data to and receive data from the correction device 300.

The number of pulses referred to in this specification may refer to a value obtained by dividing a distance between reference marks, which will be described later, by a resolution of a measuring device, e.g., the measurement device 200. For example, when the resolution of the measurement device 200 is 1 μm, the number of pulses for the first printing process may be a value obtained by dividing a 1-1 distance to be described later by 1 um. For example, when the resolution of the measurement device 200 is 1 um, the number of pulses in the second printing process may be a value obtained by dividing a 1-2 distance to be described later by 1 um.

The correction device 300 may include a memory 310, a processor 320, and a communication module 330. The correction device 300, which is one component of the printing system 10, may control the other components of the printing system 10.

The memory 310 stores data that supports various functions of the correction device 300. The memory 310 may store one or more application programs that the correction device 300 may execute, pieces of data for operations of the correction device 300, and other instructions. At least some of the plurality of application programs may be downloaded to the memory 310 from an external server through wireless communication. The application programs may be stored in the memory 310, installed in the correction device 300, and driven by the processor 320 to perform an operation (or function) of the correction device 300.

The memory 310 may include at least one type of storage medium selected from among a flash memory type, a hard disk type, a solid state disk (SSD) type, a silicon disk drive (SDD) type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The memory 310 may include web storage that performs a storage function on the Internet.

The processor 320 may control other components of the printing system 10 by executing the instructions stored in the memory 310. The processor 320 may execute the instructions stored in the memory 310.

The processor 320 is a component capable of performing calculations and controlling other devices. The processor 320 may be, for example, a central processing unit (CPU), an application processor (AP), a graphics processing unit (GPU), or the like. The CPU, the AP, or the GPU may include one or more cores therein, and the CPU, the AP, or the GPU may operate using an operating voltage and a clock signal. Typically, a CPU or AP may include a few cores optimized for serial processing, whereas a GPU may include several thousands of smaller and more efficient cores designed for parallel processing.

The processor 320 may provide or process appropriate information or functions to a user by processing signals, data, information, etc. input or output through the above-described components or by running an application program stored in the memory 310.

The communication module 330 may transmit/receive information to/from a base station or a camera including a communication function through an antenna. In this case, the communication module 330 may include a modulator, a demodulator, a signal processor, and the like. Alternatively, the communication module 330 may perform a wired communication function.

Wireless communication may refer to communication using a wireless communication network that uses a communication facility previously installed by telecommunication companies and a frequency of the communication facility. In this case, the communication module 330 may be used in various wireless communication systems such as code division multiple access (CDMA), frequency division multiple access (FDMA), time division multiple access (TDMA), orthogonal frequency division multiple access (OFDMA), and single carrier frequency division multiple access (SC-FDMA), and may also be used in 3rd generation partnership project (3GPP) long term evolution (LTE). The communication module 330 may also be used in 6G communication scheduled to be commercialized in the future, as well as 5G communication currently being commercialized. However, embodiments in accordance with the present specification may utilize a pre-installed communication network without being bound by such a wireless communication method.

Bluetooth, Bluetooth Low Energy (BLE), beacon, Radio Frequency Identification (RFID), Infrared Data Association (IrDA), Ultra Wideband (UWB), ZigBee, etc. may be used as short-distance communication technologies.

The correction device 300 according to the disclosure may include the memory 310 storing instructions, the processor 320 performing calculations based on the instructions, and the communication module 330 communicating with an external device under a control by the processor 320. In this case, the external device may refer to other components except for the correction device 300 in the printing system 10.

Although not shown, the correction device 300 may be connected to an input unit and an output unit by wire and/or wirelessly. The input unit may be a user interface, such as a key pad, a dome switch, a touch pad (e.g., a capacitive overlay type, a resistive overlay type, an infrared beam type, an integral strain gauge type, a surface acoustic wave type, a piezoelectric type, or the like), a mouse, a remote controller, a jog wheel, or a jog switch. The output unit may include a display. The display may provide a resultant image output by the correction device 300 so that an operator may monitor a displayed image. The display may provide the operator with visual information and/or audible information for grasping a work area and a location and movement of the printing module 100 moving within the work area. The display may be a computer screen, a TV screen, a mobile terminal screen, or a projector. When the display is a touch screen, the touch screen may function as the input unit.

Figure 3:
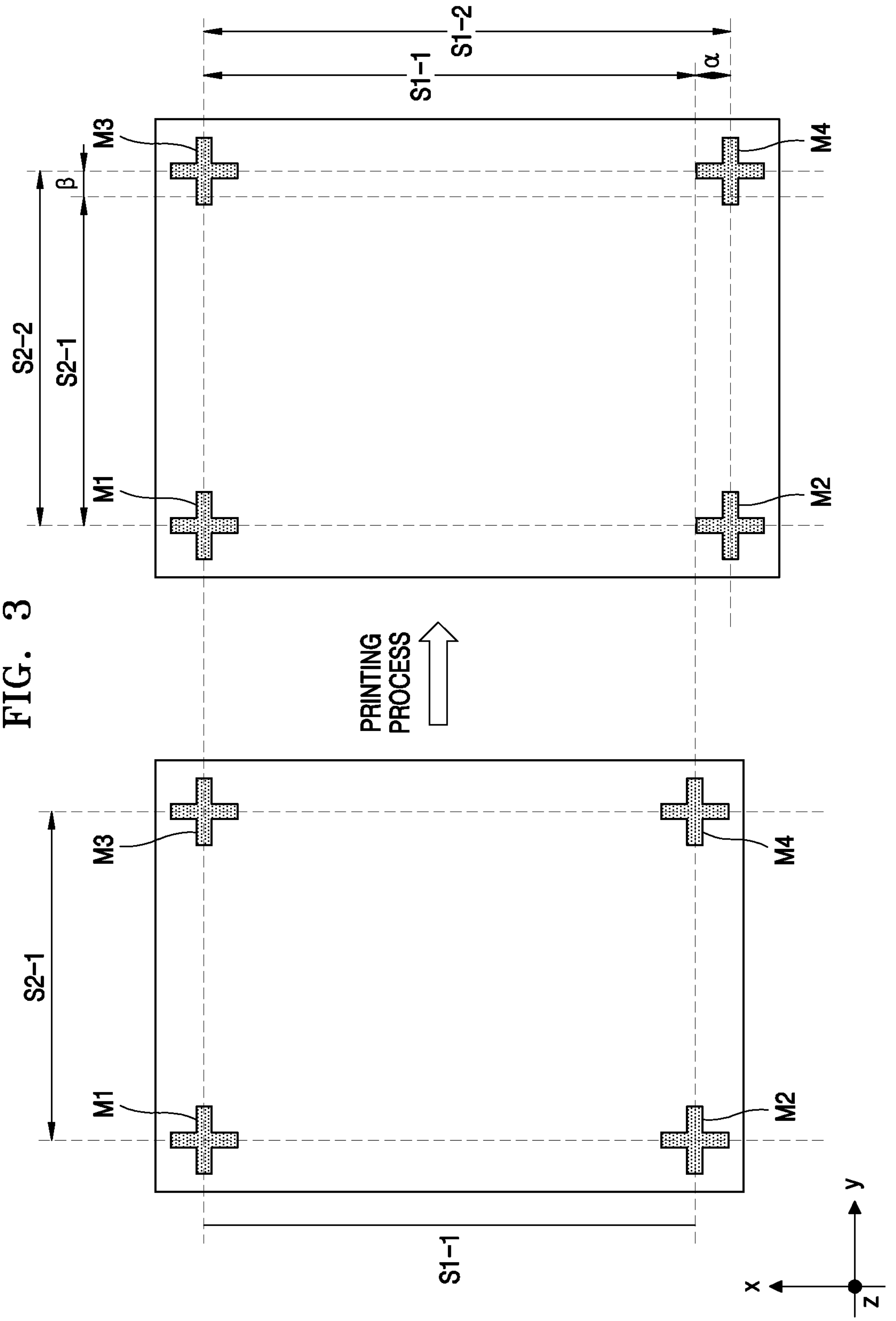
FIG. 3 is a schematic plan view of an upper surface of a substrate before/after a printing process.

FIG. 3 is a schematic plan view of an upper surface of a substrate before and after a printing process.

Referring to FIG. 3, at least one reference mark may be disposed or displayed on the upper surface of the substrate.

For example, first, second, third, and fourth reference marks M1, M2, M3, and M4 may be disposed or displayed on the upper surface of the substrate. However, the illustrated number of reference marks is only one example, and the scope of the disclosure is not limited thereto.

The first reference mark M1 may be near one of the edges of the substrate on the upper surface of the substrate and may be a reference or an origin for starting a printing process. The discharge head unit 130 may discharge an ink material while moving in a specific direction that may be identified using the first reference mark M1 as a reference or origin.

The second reference mark M2 may be spaced apart from the first reference mark M1 in a first direction by a 1-1 distance S1-1 on a plan view. The discharge head unit 130 may discharge the ink material between the first reference mark M1 and the second reference mark M2 while moving relative to the substrate in a direction from the first reference mark M1 to the second reference mark M2.

The third reference mark M3 may be spaced apart from the first reference mark M1 in a second direction by a 2-1 distance S2-1 on a plan view. The discharge head unit 130 may discharge the ink material between the first reference mark M1 and the third reference mark M3 while moving in a direction from the first reference mark M1 to the third reference mark M3. The discharge head unit 130 may include a plurality of nozzles arranged or distributed along the second direction, and the correction device 300 may select a nozzle from which the ink material is discharged, so that the ink material may be discharged to a specific location between the first reference mark M1 and the third reference mark M3.

The fourth reference mark M4 may be spaced apart from the second reference mark M2 in the second direction by the 2-1 distance S2-1 in a plan view and may be spaced apart from the third reference mark M3 in the first direction by the 1-1 distance S1-1.

During a printing process of discharging the ink material through the discharge head unit 130, heat generated in the discharge head unit 130 may expand the substrate. As a process is miniaturized, reliability and accuracy of printing may be affected by deformation, such as expansion, of the substrate.

Due to thermal expansion, the 1-1 distance S1-1 may be changed to the 1-2 distance S1-2. The 2-1 distance S2-1 may be changed to a 2-2 distance S2-2. Therefore, a distance between the first fiducial mark M1 and the second fiducial mark M2 may be changed due to thermal expansion, and a distance between the first fiducial mark M1 and the third fiducial mark M3 may also be changed due to thermal expansion. A variation in the substrate in the first direction due to thermal expansion may be indicated as a in FIG. 3, and a variation in the substrate in the second direction due to thermal expansion may be indicated as B in FIG. 3. The difference a between the 1-1 distance S1-1 and the 1-2 distance S1-2 may be proportional to the degree of deformation of the substrate due to heat generated during the first printing process. The difference B between the 2-1 distance S2-1 and the 2-2 distance S2-2 may also be proportional to the degree of deformation of the substrate due to heat generated during the first printing process. As will be described later, a difference (not shown) between the 1-2 distance S1-2 and a 1-3 distance may be proportional to the degree of deformation of the substrate due to heat generated in the second printing process, and, as the printing process is repeatedly conducted, the degree of deformation of the substrate may further increase.

Figure 4:
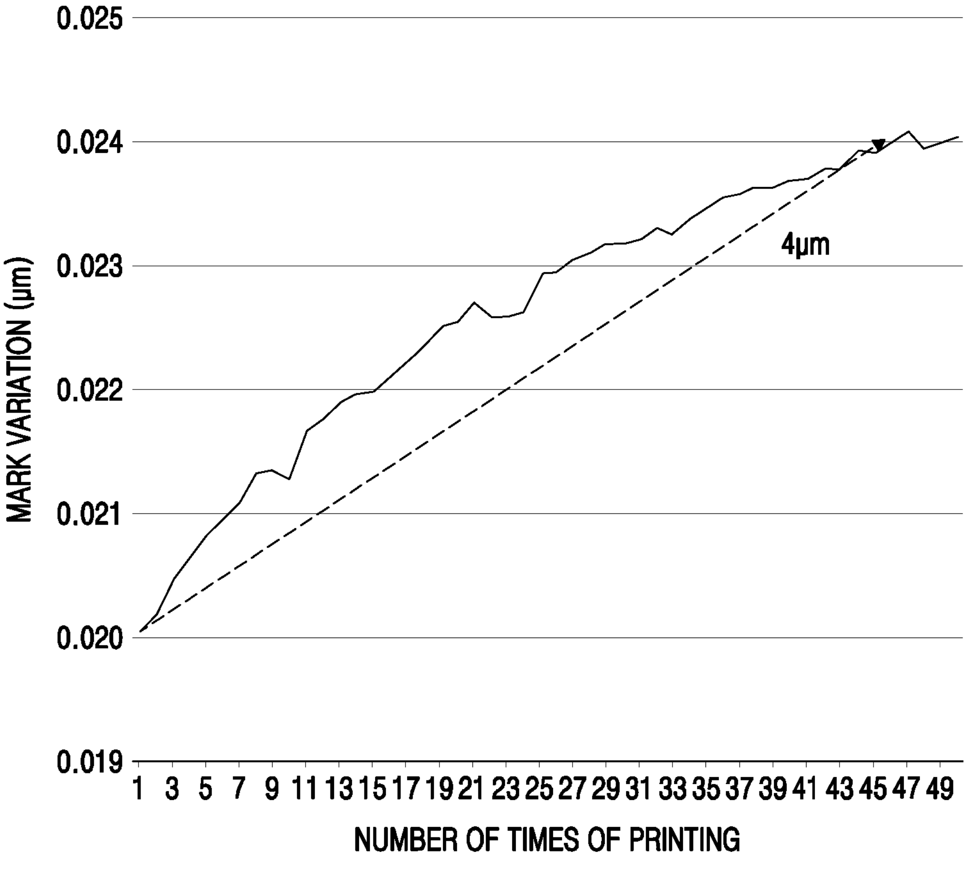
FIG. 4 is a graph schematically showing variation in a distance between reference marks according to the number of times a printing process is conducted.

FIG. 4 is a graph schematically showing a variation in a distance between reference marks as a function of the number of times a printing process is conducted on the substrate. Referring to FIG. 4, the variation in a distance between reference marks may be proportional to the number of times the printing process is performed. In which case, a cycle during which the ink material is discharged may need to be corrected according to the number of times the printing process has been performed.

Figure 5:
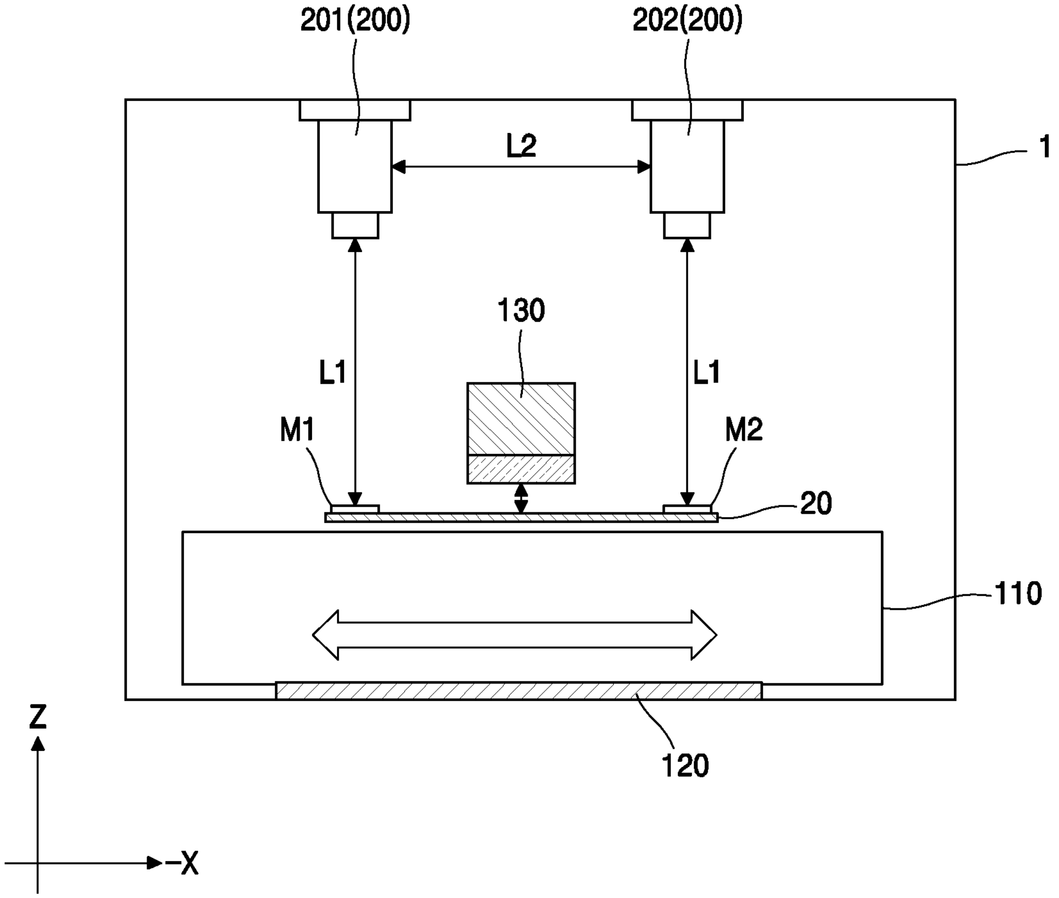
FIGS. 5 and 6 are views schematically illustrating implementations of a printing system according to an embodiment.
Figure 6:
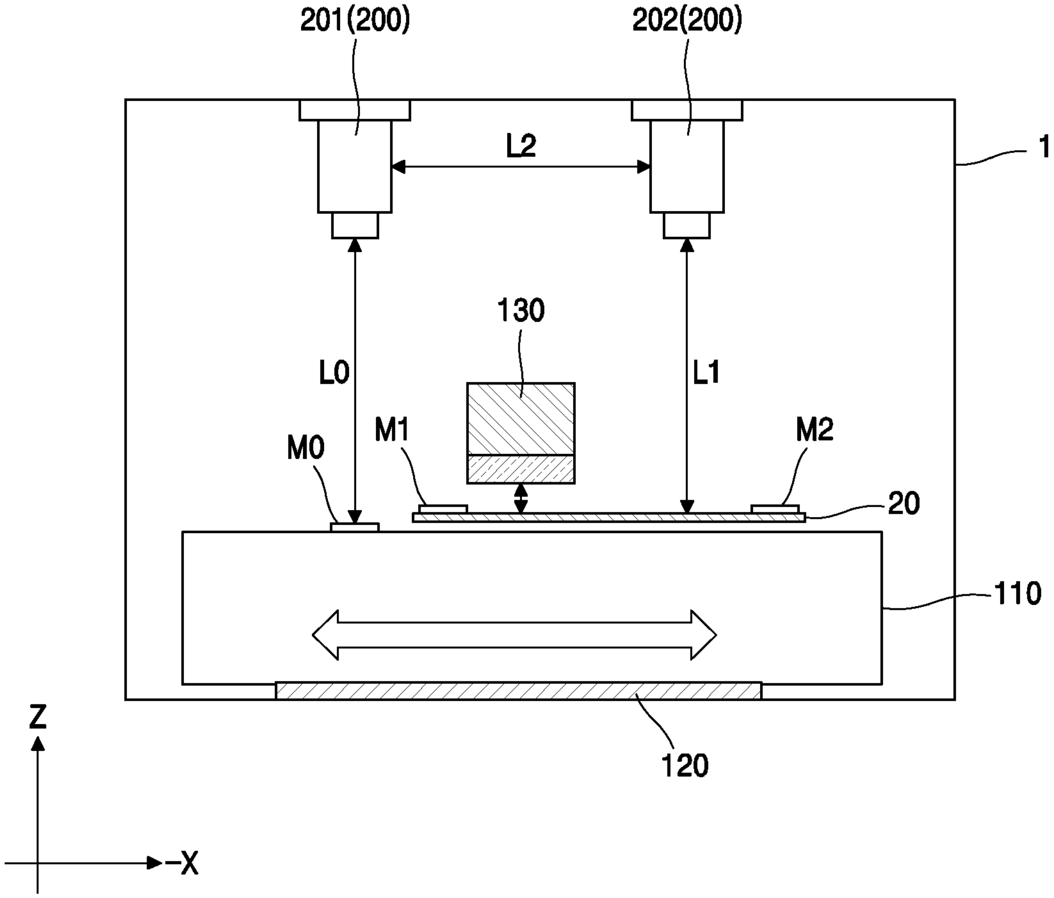

FIGS. 5 and 6 are views schematically illustrating implementations of a printing system according to an embodiment.

Referring to FIGS. 5 and 6, a first measurement device 201 may be disposed on or above the first reference mark M1. A distance L1 between the first reference mark M1 or an upper surface of a substrate 20 and the first measurement device 201 may be measured or set in advance of a printing process. More generally, the first measurement device 201 may be disposed to obtain image data representing images including the first reference mark M1. A second measurement device 202 may be disposed on or above the second reference mark M2 to obtain image data representing images including the second reference mark M2, and the second measurement device 202 may also be the distance L1 from the upper surface of the substrate 20. More generally, the second measurement device 202 may be disposed to obtain image data representing images including the second reference mark M2. A distance L2 between the first measurement device 201 and the second measurement device 202 may be measured or set in advance.

The correction device 300 may obtain information about a distance between the first reference mark M1 and the second reference mark M2 or information about a variation in the distance based on a triangulation or geometric method using the distance L1 between the first measurement device 201 and the first reference mark M1 and the distance L2 between the first measurement device 201 and the second measurement device 202. For example, the printing system 10 may include the measurement device 200 disposed on the substrate 20 to obtain the image data representing a first image including the first reference mark M1 and a second image including the second reference mark M2. In this case, the correction device 300 may use the image data from the first measurement device 201 and the second measurement device 202 obtain the information about the distance between the first reference mark M1 and the second reference mark M2 or the information about the variation in the distance. For example, the correction device can identify from the image data the locations of the reference marks M1 and M2 relative to a length of a reference object (not shown) disposed around the substrate 20 or can use a geometric method and the distances L1 and L2 to identify how far the reference marks M1 and M2 may have shifted from being directly under the measurement devices 201 and 202.

Referring to FIGS. 5 and 6, the substrate 20 may be spaced apart from the top of a driving stage 110 by a certain distance. For example, the substrate 20 may float a certain distance from the driving stage 110 by using air floating technology. To this end, the driving device 120 disposed around the driving stage 110 may include a device for forming air pressure of a predetermined level.

Referring to FIGS. 5 and 6, the discharge head unit 130 may be spaced apart from the substrate 20. However, for precise printing, the discharge head unit 130 may be disposed very close to the upper surface of the substrate 20. For example, the discharge head unit 130 may be spaced about 1 mm from the upper surface of the substrate 20. Therefore, heat generated from the discharge head unit 130 may be easily transferred to the substrate 20.

Referring to FIGS. 5 and 6, a printing process may be performed in a chamber 1. An internal temperature of the chamber 1 may be generally a room temperature. For example, the internal temperature of the chamber 1 may be about 23° C. The discharge head unit 130 may be about 50° C. In a micrometer or nanometer-scale process, thermal energy generated by the discharge head unit 130 may expand the substrate 20.

As shown in FIG. 6, the substrate 20 may be moved to expose an alignment mark M0, which on the driving stage 110. The alignment mark may be disposed under the substrate 20 when the substrate in in the position shown in FIG. 5, and in that position, the alignment mark M0 may overlap or have the same shape as the first reference mark M1 when viewed in a direction perpendicular to the substrate 20. The location of the first measurement device 201 may also be changed by the heat of the discharge head unit 130. Therefore, the location of the first measurement device 201 may also need to be corrected. To this end, the alignment mark M0 may be disposed on the upper surface of the driving stage 110. A distance L0 between the measurement device 201 and the alignment mark M0 may be greater than distance L1 since the alignment mark M0 is on driving stage 110 under the substrate 20. After the substrate 20 is moved, the first measurement device 201 may obtain image data representing an image including the alignment mark M0, and the correction device 300 may change the location of the first measurement device 201, based on the image data representing an image including the alignment mark M0. To this end, the printing system 10 may include an additional driving device for changing the location of the first measurement device 201.

Figure 7:
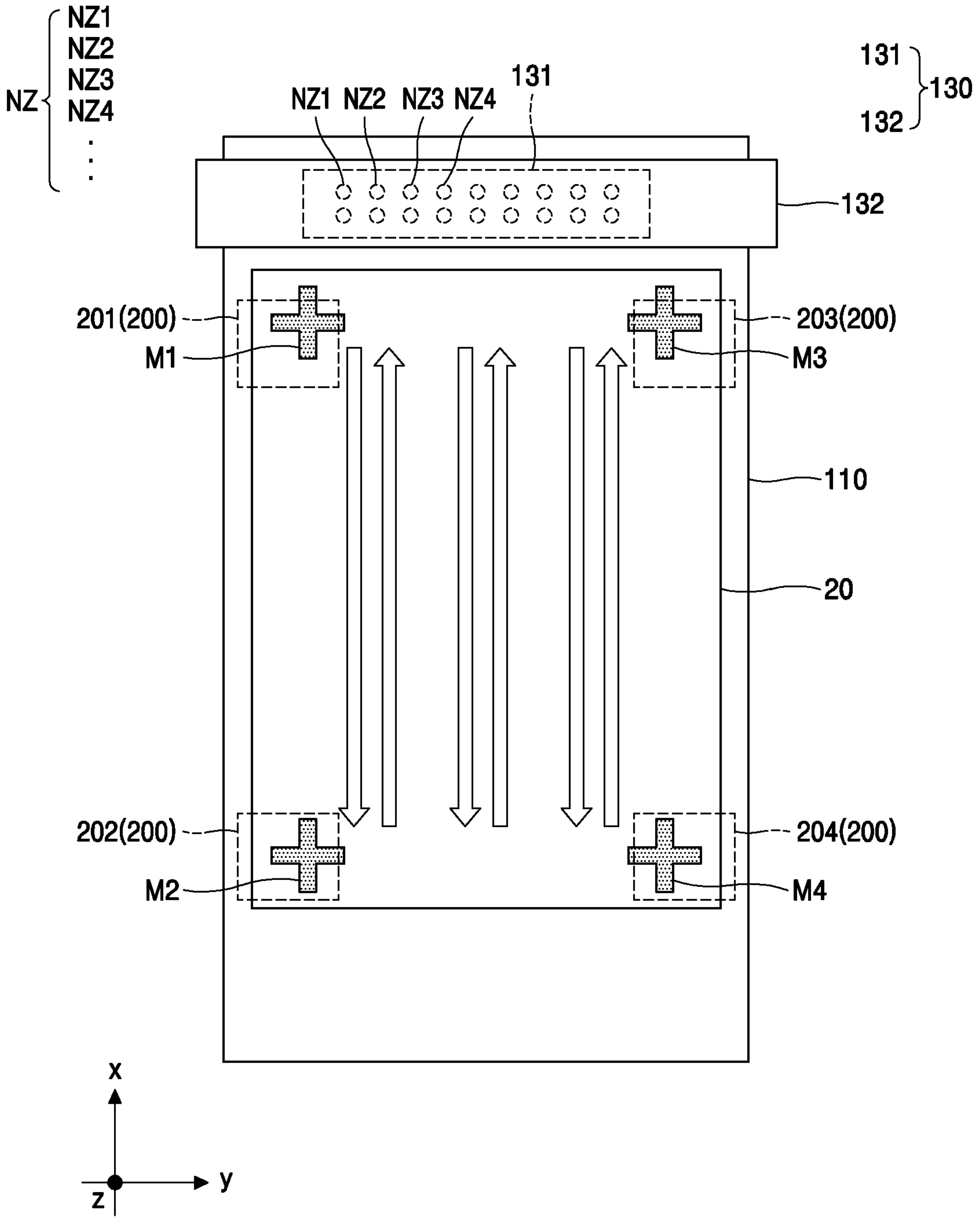
FIG. 7 is a view schematically illustrating an example of a printing process performed using a printing system according to an embodiment.

FIG. 7 is a view schematically illustrating an example of a printing process performed using a printing system according to an embodiment.

As shown in FIG. 7, the discharge head unit 130 may include a plurality of nozzles NZ. The plurality of nozzles NZ may include a first nozzle NZ1, a second nozzle NZ2, a third nozzle NZ3, a fourth nozzle NZ4, and the like. The plurality of nozzles NZ may be spaced apart from each other by a preset distance. Accordingly, the correction device 300 may store coordinate information about respective locations of the plurality of nozzles NZ in advance.

The correction device 300 may control the discharge head unit 130 to discharge an ink material from the first nozzle NZ1, while controlling the discharge head unit 130 to move in a first direction. The first direction may be a direction from the first reference mark M1 to the second reference mark M2 or a −x-axis direction. For example, a process of printing dots by using the first nozzle NZ1 while the discharge head unit 130 is moving from the first reference mark M1 toward the second reference mark M2 may be a first printing process. For example, a process of printing dots by using the second nozzle NZ2 while the discharge head unit 130 is moving from the second reference mark M2 toward the first reference mark M1 may be a second printing process. For example, a process of printing dots by using the third nozzle NZ3 while the discharge head unit 130 is moving from the first reference mark M1 toward the second reference mark M2 may be a third printing process. For example, a process of printing dots by using the fourth nozzle NZ4 while the discharge head unit 130 is moving from the second reference mark M2 toward the first reference mark M1 may be a fourth printing process. As such, an n-th printing process may be performed using any one of the plurality of nozzles NZ.

As shown in FIG. 7, the discharge head unit 130 may include a nozzle fixing unit 131 and a body unit 132. The nozzle fixing unit 131 is a component for installing the plurality of nozzles NZ on the body unit 132 and may be one frame or one plate on which the plurality of nozzles NZ are formed. The body unit 132, which is a housing of the discharge head unit 130, may be moved in the above-described first direction by a driving device, e.g., the driving device 120 of FIG. 5 and FIG. 6. In some cases, the nozzle fixing unit 131 may move within the body unit 132 in a second direction. The second direction is a direction intersecting the first direction and may refer to a y-axis direction or a −y-axis direction.

Figure 8:
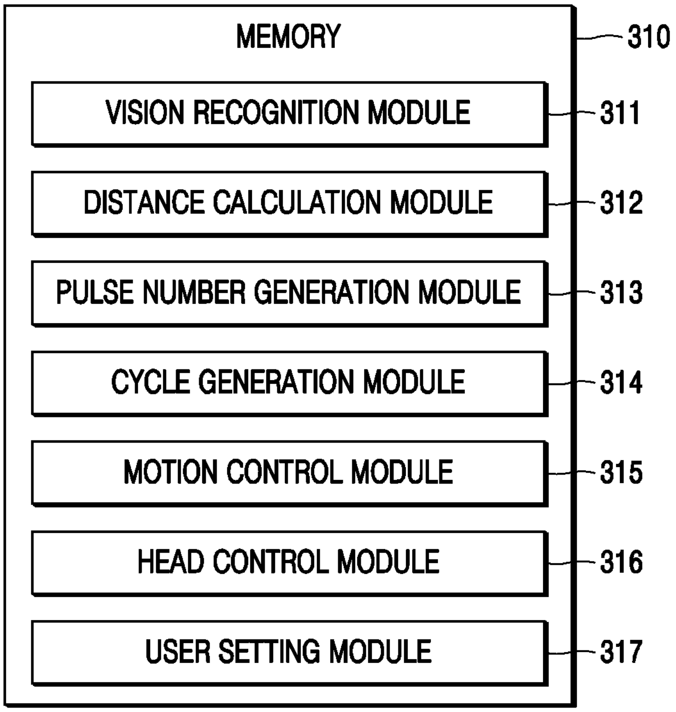
FIG. 8 is a conceptual diagram schematically illustrating functional components implemented in a memory of FIG. 2.

FIG. 8 is a conceptual diagram schematically illustrating functional components that may be stored in the memory 310 of FIG. 2 and implemented when the processor 320 of FIG. 2 executes the functional components.

As shown in FIG. 8, the memory 310 may include a vision recognition module 311, a distance calculation module 312, a coordinate information generation module, a pulse number generation module 313, a cycle generation module 314, a motion control module 315, a head control module 316, and a user setting module 317.

The vision recognition module 311 may recognize reference marks such as the first reference mark M1 and the second reference mark M2 included in the image data. The vision recognition module 311 may obtain a reference point of each of the reference marks according to a preset criterion in order to obtain a distance between the reference marks. For example, the vision recognition module 311 may obtain the center point of each of the reference marks as a reference point. The vision recognition module 311 may also recognize an alignment mark, for example, may recognize a center point of the alignment mark as a reference point for position correction of the measurement device 200.

The distance calculation module 312 may obtain information about a distance between reference marks or may calculate the distance between the reference marks. For example, the distance calculation module 312 may obtain a 1-1 distance S1-1 between the first reference mark M1 and the second reference mark M2 disposed on the upper surface of the substrate 20 of FIGS. 5 through 7. For example, the distance calculation module 312 may obtain a 2-1 distance S2-1 between the first reference mark M1 and the third reference mark M3 disposed on the upper surface of the substrate 20. Each distance may refer to a distance between reference points (or center points) of the reference marks recognized by the vision recognition module 311.

For example, the distance calculation module 312 may obtain a 1-2 distance S1-2 between the first reference mark M1 and the second reference mark M2 disposed on the upper surface of the substrate 20, after the first printing process is performed. For example, the distance calculation module 312 may obtain a 2-2 distance S2-2 between the first reference mark M1 and the third reference mark M3 disposed on the upper surface of the substrate 20, after the first printing process is performed.

For example, the distance calculation module 312 may obtain a 1-3 distance between the first reference mark M1 and the second reference mark M2 disposed on the upper surface of the substrate 20, after the second printing process is performed. For example, the distance calculation module 312 may obtain a 2-3 distance between the first reference mark M1 and the third reference mark M3 disposed on the upper surface of the substrate 20, after the second printing process is performed.

For example, the distance calculation module 312 may obtain a 1-4 distance between the first reference mark M1 and the second reference mark M2 disposed on the upper surface of the substrate 20, after the third printing process is performed. For example, the distance calculation module 312 may obtain a 2-4 distance between the first reference mark M1 and the third reference mark M3 disposed on the upper surface of the substrate 20, after the third printing process is performed.

As such, the distance calculation module 312 may obtain distances between the reference marks before/after the n-th printing process is performed. Accordingly, the distance calculation module 312 may calculate the distances between the reference marks before/after the n-th printing process is performed. Therefore, distances between reference marks mentioned in this specification, such as not only the above-described 1-1 distance S1-1 and the above-described The 1-2 distance S1-2 but also the 1-3 distance and the 1-4 distance, may be obtained based on the image data obtained by the measurement device 200. The distance calculation module 312 may be used each time a distance is measured.

The pulse number generation module 313 may generate a first pulse number corresponding to the 1-1 distance S1-1. For example, the correction device 300 may control a change in the location of the substrate 20 in proportion to the number of pulses. When the number of pulses increases, the correction device 300 may move the substrate 20 more, and, when the number of pulses decreases, the correction device 300 may move the substrate 20 less.

For example, when the 1-2 distance S1-2 is greater than the 1-1 distance S1-1, the pulse number generation module 313 may increase a first pulse number in proportion to a size (or an absolute value) of a difference between the 1-1 distance S1-1 and the 1-2 distance S1-2. Because the distance between the first fiducial mark M1 and the second fiducial mark M2 increases due to thermal expansion, the correction device 300 needs to further move the substrate 20 by the distance increased due to thermal expansion. Accordingly, the pulse number generation module 313 may generate a second pulse number corresponding to the 1-2 distance S1-2. The pulse number generation module 313 may obtain a second pulse number by correcting the first pulse number based on the 1-2 distance S1-2.

For example, the pulse number generation module 313 may generate a third pulse number corresponding to the 1-3 distance. The pulse number generation module 313 may obtain a third pulse number by correcting the second pulse number, based on the 1-3 distance.

For example, the pulse number generation module 313 may generate a fourth pulse number corresponding to the 1-4 distance. The pulse number generation module 313 may obtain a fourth pulse number by correcting the third pulse number, based on the 1-4 distance.

For example, the pulse number generation module 313 may generate an n-th pulse number corresponding to a distance between reference marks before/after the n-th printing process is performed or a variation in the distance.

The cycle generation module 314 may generate a cycle corresponding to the number of pulses generated by the pulse number generation module 313. The cycle generated by the cycle generation module 314 may refer to a cycle in which the ink material is discharged, while the discharge head unit 130 moves between the first reference mark M1 and the second reference mark M2. Accordingly, if the speed of the relative movement of the discharge head unit does not change, the number of times (or frequency) the ink material is discharged during the same period of time may decrease as the length of the cycle increases. On the other hand, as the length of the cycle decreases, the number of times (or frequency) the ink material is discharged during the same period of time may increase.

For example, the cycle generation module 314 may generate a first cycle corresponding to the first pulse number. The first pulse number may be associated with a moving distance of the discharge head unit 130. The discharge head unit 130 may move by a distance corresponding to the first pulse number.

For example, the first cycle may be associated with a distance or time interval between dots printed on the substrate 20 by the first printing process. The first cycle may be associated with a distance or time interval between pixels printed on the substrate 20 by the first printing process. The first cycle may be associated with a distance or time interval between patterns printed on the substrate 20 by the first printing process. The aforementioned intervals may have sizes or lengths corresponding to the first cycle.

For example, the cycle generation module 314 may generate a second cycle corresponding to the second pulse number. The second pulse number may be associated with the moving distance of the discharge head unit 130. The discharge head unit 130 may move by a distance corresponding to the second pulse number. When the second pulse number is greater than the first pulse number, the second cycle may be longer than the first cycle because the same pattern needs to be printed over a wider distance.

For example, the second cycle may be associated with a distance or time interval between dots printed on the substrate 20 by the second printing process. The second cycle may be associated with a distance or time interval between pixels printed on the substrate 20 by the second printing process. The second cycle may be associated with a distance or time interval between patterns printed on the substrate 20 by the second printing process. The aforementioned intervals may have sizes or lengths corresponding to the second cycle. Accordingly, the above-described intervals in the second printing process performed by the second cycle may be longer than the above-described intervals in the first printing process performed by the first cycle.

For example, the cycle generation module 314 may generate a third cycle corresponding to the third pulse number. The third pulse number may be associated with the moving distance of the discharge head unit 130. The discharge head unit 130 may move by a distance corresponding to the third pulse number. When the third pulse number is greater than the second pulse number, the third cycle may be less than the second cycle, because the same pattern needs to be printed over a wider distance.

For example, the third cycle may be associated with a distance or time interval between dots printed on the substrate 20 by the third printing process. The third cycle may be associated with a distance or time interval between pixels printed on the substrate 20 by the third printing process. The third cycle may be associated with a distance or time interval between patterns printed on the substrate 20 by the third printing process. The aforementioned intervals may have sizes or lengths corresponding to the third cycle. Accordingly, the above-described intervals in the third printing process performed by the third cycle may be longer than the above-described intervals in the second printing process performed by the second cycle.

For example, the cycle generation module 314 may generate a fourth cycle corresponding to the fourth pulse number. The fourth pulse number may be associated with the moving distance of the discharge head unit 130. The discharge head unit 130 may move by a distance corresponding to the fourth pulse number. When the fourth pulse number is greater than the third pulse number, the fourth cycle may be less than the third cycle, because the same pattern needs to be printed over a wider distance.

For example, the fourth cycle may be associated with a distance or time interval between dots printed on the substrate 20 by the fourth printing process. The fourth cycle may be associated with a distance or time interval between pixels printed on the substrate 20 by the fourth printing process. The fourth cycle may be associated with a distance or time interval between patterns printed on the substrate 20 by the fourth printing process. The aforementioned intervals may have sizes or lengths corresponding to the fourth cycle. Accordingly, the above-described intervals in the fourth printing process performed by the fourth cycle may be longer than the above-described intervals in the third printing process performed by the third cycle.

For example, the cycle generation module 314 may also generate an n-th cycle corresponding to an n-th pulse number. The n-th pulse number may be associated with the moving distance of the discharge head unit 130. The discharge head unit 130 may move by a distance corresponding to the n-th pulse number. When the n-th pulse number is greater than an $(n-1)^{th}$ pulse number, the n-th cycle may be less than the $(n-1)^{th}$ cycle, because the same pattern needs to be printed over a wider distance.

For example, the n-th cycle may be associated with a distance or time interval between dots printed on the substrate 20 by the n-th printing process. The n-th cycle may be associated with a distance or time interval between pixels printed on the substrate 20 by the n-th printing process. The n-th cycle may be associated with a distance or time interval between patterns printed on the substrate 20 by the n-th printing process. The aforementioned intervals may have sizes or lengths corresponding to the n-th cycle. Accordingly, the above-described intervals in the n-th printing process performed by the n-th cycle may be longer than the above-described intervals in the $(n-1)^{th}$ printing process performed by the $(n-1)^{th}$ cycle.

The motion control module 315 may be configured to control changes in the location of the substrate 20, based on the number of pulses. The motion control module 315 may receive or be pre-programmed a reference movement distance of the substrate 20 corresponding to a reference pulse number, which may, for example, be chosen in advance, e.g., for a room temperature substrate. The motion control module 315 may obtain ratio information of a corrected pulse number compared to the reference pulse number or a current pulse number. Based on the ratio information, the motion control module 315 may correct or change the reference movement distance. Based on a corrected or changed movement distance, the motion control module 315 may generate an instruction capable of controlling the aforementioned driving device 120. The generated instruction may be transmitted to the driving device 120 to change the location of the substrate 20 by the corrected or changed movement distance.

The head control module 316 may control intervals between dots or pixels printed on the substrate 20, based on a cycle. In other words, the head control module 316 may control the nozzles of the discharge head unit 130 to control the amount, discharge frequency, and discharge time of the ink material discharged from the nozzles. In other words, the head control module 316 may generate instructions for controlling the discharge head unit 130 or the components of the discharge head unit 130, based on cycle values. The generated instructions may be transmitted to the discharge head unit 130, and the dots or the pixels may be printed at corrected or changed intervals.

The user setting module 317 may receive pieces of information input by a user and store the pieces of information input by the user. The user setting module 317 may correct or change a pulse number, a cycle, and the like, based on the pieces of information input by the user.

A printing method according to another embodiment will be described in detail based on the above-described matters.

For reference, a subject performing the printing method according to an embodiment may be the printing system 10 under control of the above-described correction device 300 or the processor 320 included in the correction device 300.

The printing method according to another embodiment differs from the printing system 10 according to the above-described embodiment only in content and category and may be the same as the printing system 10 according to the above-described embodiment in terms of the core principles implementing the printing technology.

For convenience of description, the same or overlapping matters in the description of the printing method according to another embodiment as the description given above may be omitted.

Figure 9:
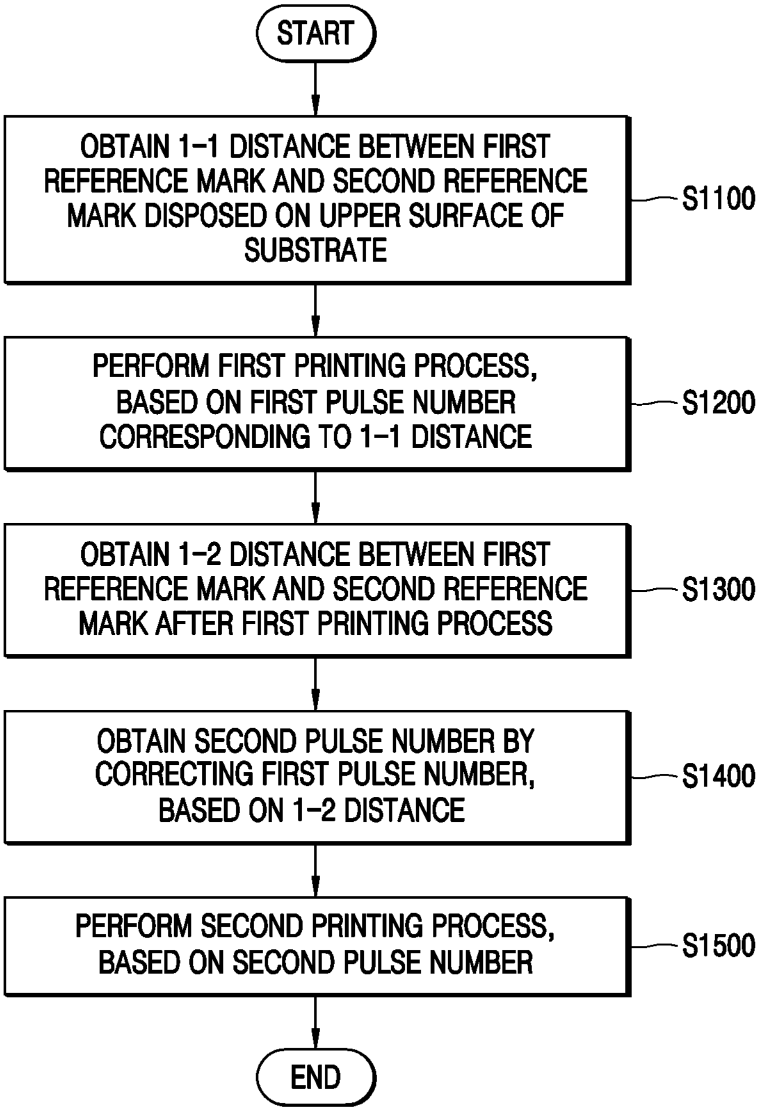
FIG. 9 is a flowchart of a printing method according to another embodiment.
Figure 10:
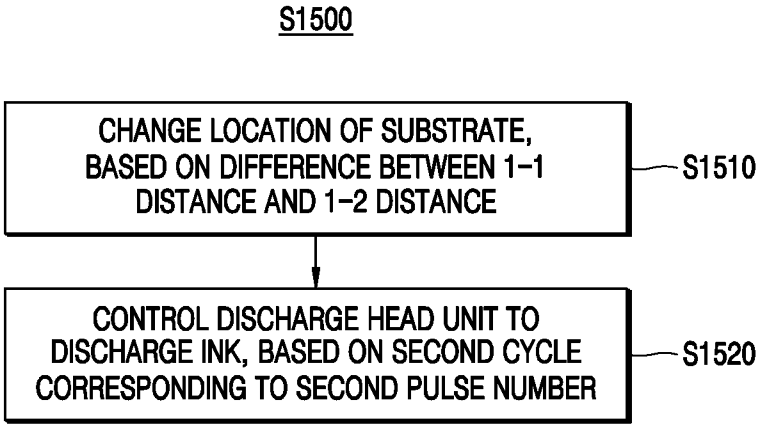
FIG. 10 is a flowchart of an operation of performing second printing process based on the second pulse number.

FIG. 9 is a flowchart of a printing method according to an embodiment, and FIG. 10 is a flowchart of operation S1500 of the printing method of FIG. 9.

As shown in FIG. 9, the printing method may include an operation S1100 of obtaining the 1-1 distance S1-1 between the first reference mark M1 and the second reference mark M2 disposed on the upper surface of the substrate 20, an operation S1200 of performing the first printing process based on the first pulse number corresponding to the 1-1 distance S1-1, an operation S1300 of obtaining the 1-2 distance S1-2 between the first reference mark M1 and the second reference mark M2 after the first printing process, an operation S1400 of obtaining a second pulse number by correcting the first pulse number based on the 1-2 distance S1-2, and an operation S1500 of performing the second printing process based on the second pulse number.

In operation S1100, a vision recognition algorithm may be applied to image data obtained by the measurement device 200. In detail, operation S1100 may include recognizing the first reference mark M1 and the second reference mark M2 in the image data obtained by the measurement device 200, recognizing or extracting respective reference points (or center points) of the recognized first reference mark M1 and the recognized second reference mark M2, and obtaining the 1-1 distance S1-1 between the recognized or extracted reference points (or center points).

For example, the obtaining of the 1-1 distance S1-1 between the reference points (or center points) may be performing triangulation or the like, based on a pre-input or pre-measured distance between the first measurement device 201 and the substrate 20 (or the first reference mark M1) and a distance between the first measurement device 201 and the second measurement device 202.

Operation S1200 may include obtaining the first pulse number corresponding to the 1-1 distance S1-1 and performing the first printing process based on the obtained first pulse number. For example, in the obtaining of the first pulse number, the first pulse number may be received from the user.

Alternatively, for example, in the obtaining of the first pulse number, a pre-input or pre-set first pulse number may be loaded in correspondence with the 1-1 distance S1-1.

Alternatively, for example, the obtaining of the first pulse number may include obtaining ratio information of a pre-input or pre-set reference distance between the first reference mark M1 and the second reference mark M2 and the 1-1 distance S1-1, and obtaining the first pulse number by correcting a pre-input or pre-set reference pulse number, based on the obtained ratio information.

In operation S1200, the discharge head unit 130 may be controlled to discharge ink, based on a first cycle corresponding to the first pulse number. In the first printing process, the discharge head unit 130 may be controlled to discharge ink, based on the first cycle corresponding to the first pulse number.

For example, the first cycle may be received from the user.

Alternatively, for example, in the obtaining of the first pulse number, a pre-input or pre-set first pulse number may be loaded in correspondence with the 1-1 distance S1-1.

Alternatively, for example, the obtaining of the first pulse number may include obtaining ratio information of a pre-input or pre-set reference distance between the first reference mark M1 and the second reference mark M2 and the 1-1 distance S1-1, and obtaining the first pulse number by correcting a pre-input or pre-set reference pulse number based on the obtained ratio information.

In operation S1300, the vision recognition algorithm may be re-applied to the image data obtained by the measurement device 200. In detail, operation S1300 may include re-recognizing the first reference mark M1 and the second reference mark M2 in the image data obtained by the measurement device 200 after operation S1200, re-recognizing or re-extracting respective reference points (or center points) of the re-recognized first reference mark M1 and the re-recognized second reference mark M2, and obtaining the 1-2 distance S1-2 between the re-recognized or re-extracted reference points (or center points).

In operation S1300, when the obtained 1-2 distance S1-2 and the obtained 1-1 distance S1-1 are the same, the second pulse number may not be obtained. To this end, operation S1300 may further include comparing the obtained 1-2 distance S1-2 with the obtained 1-1 distance S1-1. In this case, a process subsequent to operation S1300 may be performed.

As described above, when operation S1400 is not performed, the printing method may further include recognizing an alignment mark located below the first reference mark M1, recognizing or extracting a reference point (or center point) of the alignment mark, and correcting the location of the first measurement device 201, based on the recognized or extracted reference point (or center point) of the alignment mark. The alignment mark may be disposed or displayed on the upper surface of the driving stage 110 under the substrate 20 so that the location thereof is not changed due to thermal expansion.

The correcting of the location of the first measurement device 201 may include comparing first coordinate information of the reference point (or center point) of the alignment mark obtained before the first printing process is performed with second coordinate information of the reference point (or center point) of the alignment mark obtained after the first printing process is performed, changing the location of the first measurement device 201, based on the first coordinate information, when a difference occurs between the first coordinate information and the second coordinate information, obtaining third coordinate information of the reference point (or center point) of the alignment mark after changing the location of the first measurement device 201, and comparing the first coordinate information with the third coordinate information.

When the first coordinate information and the third coordinate information are the same as each other as a result of the comparison, the correction of the location of the first measurement device 201 may be terminated. When the first coordinate information and the third coordinate information are different from as each other as a result of the comparison, the process of obtaining fourth coordinate information of the reference point (or center point) of the alignment mark and correcting the location of the first measurement device 201, based on the first coordinate information and the fourth coordinate information may be performed again.

The example described above is focused on correcting the location of the first measurement device 201, but respective locations of the second measurement device 202, a third measurement device aligned for imaging the third reference mark M3, and a fourth measurement device aligned for imaging the fourth reference mark M4 in addition to the first measurement device 201 may also be corrected through the same technical spirit. However, alignment marks respectively corresponding to the other measurement devices may be separate marks different from the alignment mark used to correct the location of the first measurement device 201. In this case, the separate alignment mark(s) may be further displayed or disposed separately on the upper surface of the driving stage 110.

Operation S1400 may include obtaining difference information between the 1-1 distance S1-1 and the 1-2 distance S1-2, obtaining ratio information of the 1-1 distance S1-1 and the 1-2 distance S1-2 when a difference occurs between the 1-1 distance S1-1 and the 1-2 distance S1-2, and obtaining the second pulse number by correcting the first pulse number based on the obtained ratio information. In this case, the second pulse number may increase from the first pulse number by a rate at which the 1-2 distance S1-2 increases. The second pulse number may be increased to be greater than the first pulse number based on the difference between the 1-1 distance S1-1 and the 1-2 distance S1-2.

In operation S1500, the discharge head unit 130 may be moved by the 1-2 distance S1-2, based on the second pulse number, during the second printing process.

Alternatively, in operation S1500, the substrate 20 may be moved by the 1-2 distance S1-2 or the location of the substrate 20 may be changed by the 1-2 distance S1-2, during the second printing process, based on the second pulse number. The movement of the discharge head unit 130 or the movement of the substrate 20 is due to differences in printing methods during a printing process and may be applied differently depending on the cases. Alternatively, in some cases, the discharge head unit 130 and the substrate 20 may move simultaneously in correspondence with the corrected 1-2 distance S1-2.

However, as the moving distance of the discharge head unit 130 increases, a cycle, which is a criterion for discharging the ink material from the discharge head unit 130, also needs to increase together.

For example, as shown in FIG. 10, operation S1500 may include operation S1510 of changing the location of the substrate 20, based on the difference between the 1-1 distance S1-1 and the 1-2 distance S1-2, and operation S1520 of controlling the discharge head unit 130 to discharge ink based on a second cycle corresponding to the second pulse number.

Operation S1510 of changing the location of the substrate 20 based on the difference between the 1-1 distance S1-1 and the 1-2 distance S1-2 may be driving the driving device 120 based on the obtained second pulse number and changing the location of the substrate 20 by the 1-2 distance S1-2 by the driving device 120 driven based on the second pulse number.

Operation S1520 of controlling the discharge head unit 130 to discharge ink based on the second cycle corresponding to the second pulse number is an operation of performing the second printing process, wherein the second printing process may be a process in which the ink material is discharged from the discharge head unit 130 at every repetition of the second cycle or one unit pattern or one pixel is printed at every repetition of the second cycle.

For example, operation S1500 may be an operation of correcting the first cycle to the second cycle, based on the ratio information between the 1-1 distance S1-1 and the 1-2 distance S1-2 obtained in operation S1400, and performing the second printing process, based on the corrected second cycle.

The second cycle may increase to be greater than the first cycle by a ratio between the 1-1 distance S1-1 and the 1-2 distance S1-2. The second cycle may be increased to be greater than the first cycle, based on the difference between the 1-1 distance S1-1 and the 1-2 distance S1-2.

The second cycle being increased may refer to the same number of dots or pixels being printed at the 1-2 distance S1-2 but a separation distance between the dots or pixels being increased.

Accordingly, the second printing process may be a process in which the ink material is discharged from the discharge head unit 130 at every repetition of the second cycle, or one unit pattern or one pixel is printed at every repetition of the second cycle.

In addition, the printing method according to another embodiment may further include an operation of obtaining the 2-1 distance S2-1 between the first reference mark M1 and the third reference mark M3, and an operation of, after the first printing process, obtaining the 2-2 distance S2-2 between the first reference mark M1 and the third reference mark M3.

In this case, the operation of performing the second printing process may be controlling a nozzle from which ink is discharged among the plurality of nozzles NZ included in the discharge head unit 130, based on the difference between the 2-1 distance S2-1 and the 2-2 distance S2-2.

For example, the discharge head unit 130 may include the plurality of nozzles NZ. The plurality of nozzles NZ may include a first nozzle NZ1, a second nozzle NZ2, a third nozzle NZ3, a fourth nozzle NZ4, and the like. The plurality of nozzles NZ may be spaced apart from each other by a preset distance. Accordingly, the correction device 300 may store coordinate information about respective locations of the plurality of nozzles NZ in advance.

For example, when the 2-2 distance S2-2 is greater than the 2-1 distance S2-1 due to thermal deformation or thermal expansion of the substrate 20, printing reliability and accuracy during discharge of the ink material through the first nozzle NZ1 in the first printing process and discharge of the ink material through the third nozzle NZ3 in the second printing process may deteriorate.

Therefore, a nozzle disposed far from the first nozzle NZ1 may be used during the second printing process by a ratio of the 2-2 distance S2-2 increased compared to the 2-1 distance S2-1. For example, when there is no thermal deformation of the substrate 20, the second nozzle NZ2 spaced apart from the first nozzle NZ1 by a certain distance may be used in the second printing process. However, when the substrate 20 is thermally deformed and the third nozzle NZ3 is disposed away from the first nozzle NZ1 by an increased ratio of the 2-2 distance S2-2, the third nozzle NZ3 instead of the second nozzle NZ2 may be used in the second printing process.

As such, as the distance between the first reference mark M1 and the third reference mark M3 increases, a nozzle used in the printing process among the plurality of nozzles NZ included in the discharge head unit 130 may vary. In other words, the operation of performing the second printing process may include an operation of controlling a nozzle from which ink is discharged among the plurality of nozzles NZ included in the discharge head unit 130, based on the difference between the 2-1 distance S2-1 and the 2-2 distance S2-2.

Figure 11:
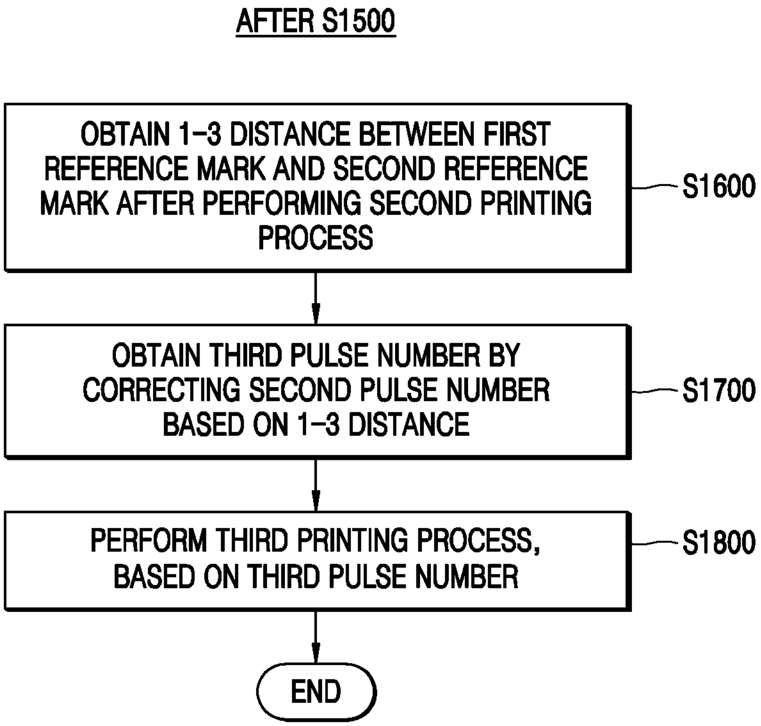
FIG. 11 is a flowchart schematically illustrating addition of some processes after an operation of performing second printing process based on the second pulse number.

FIG. 11 is a flowchart schematically illustrating addition of some processes after operation S1500 in the printing method of FIG. 9.

As shown in FIG. 11, the printing method may further include an operation S1600 of obtaining the 1-3 distance between the first reference mark M1 and the second reference mark M2 after performing the second printing process, an operation S1700 of obtaining the third pulse number by correcting the second pulse number based on the 1-3 distance, and an operation S1800 of performing the third printing process based on the third pulse number.

The operation S1600 of obtaining the 1-3 distance between the first reference mark M1 and the second reference mark M2 after performing the second printing process may be an operation of obtaining a degree of deformation of the substrate 20 due to the heat of the discharge head unit 130 during the second printing process. Due to the heat generated in the second printing process, the 1-2 distance S1-2 may be changed to the 1-3 distance.

The third pulse number may increase to be greater than the second pulse number by a rate at which the 1-3 distance increases. The third pulse number may be increased to be greater than the second pulse number, based on the difference between the 1-2 distance S1-2 and the 1-3 distance.

Operation S1700 of obtaining the third pulse number by correcting the second pulse number based on the 1-3 distance may be an operation of correcting the second pulse number based on the degree of a ratio between the 1-2 distance S1-2 and the 1-3 distance. A description of an operation of obtaining the third pulse number may be readily derived from the above description of the operation of obtaining the second pulse number, and thus will be omitted.

In operation S1800 of performing the third printing process based on the third pulse number, the discharge head unit 130 may be moved by the 1-3 distance, based on the third pulse number, during the third printing process.

Alternatively, in operation S1800 of performing the third printing process based on the third pulse number, the substrate 20 may be moved by the 1-3 distance during the third printing process, based on the third pulse number, or the location of the substrate 20 may be changed by the 1-3 distance. The movement of the discharge head unit 130 or the movement of the substrate 20 is due to differences in printing methods during a printing process and may be applied differently depending on the cases. Alternatively, in some cases, the discharge head unit 130 and the substrate 20 may move simultaneously in correspondence with the corrected 1-3 distance.

However, as the moving distance of the discharge head unit 130 increases, a cycle, which is a criterion for discharging the ink material from the discharge head unit 130, also needs to increase together.

For example, operation S1800 of performing the third printing process based on the third pulse number may include an operation of changing the location of the substrate 20, based on the difference between the 1-2 distance S1-2 and the 1-3 distance, and an operation of controlling the discharge head unit 130 to discharge ink based on a third cycle corresponding to the third pulse number.

The operation of changing the location of the substrate 20 based on the difference between the 1-2 distance S1-2 and the 1-3 distance may be driving the driving device 120 based on the obtained third pulse number and changing the location of the substrate 20 by the 1-3 distance by using the driving device 120 driven based on the third pulse number.

The operation of controlling the discharge head unit 130 to discharge ink based on the third cycle corresponding to the third pulse number is an operation of performing the third printing process, wherein the third printing process may be a process in which the ink material is discharged from the discharge head unit 130 at every repetition of the third cycle or one unit pattern or one pixel is printed at every repetition of the third cycle.

For example, the operation of performing the third printing process, based on the third pulse number, may be an operation of correcting the second cycle to the third cycle, based on ratio information between the 1-2 distance S1-2 and the 1-3 distance obtained in operation S1400, and performing the third printing process, based on the corrected third cycle.

The third cycle may increase to be greater than the second cycle by a ratio between the 1-2 distance S1-2 and the 1-3 distance. The third cycle may be increased to be greater than the second cycle, based on the difference between the 1-2 distance S1-2 and the 1-3 distance.

A cycle being increased may refer to the same number of dots or pixels being printed at the 1-3 distance but a separation distance between the dots or pixels being increased.

Accordingly, the third printing process may be a process in which the ink material is discharged from the discharge head unit 130 at every repetition of the third cycle, or one unit pattern or one pixel is printed at every repetition of the third cycle.

Figure 12:
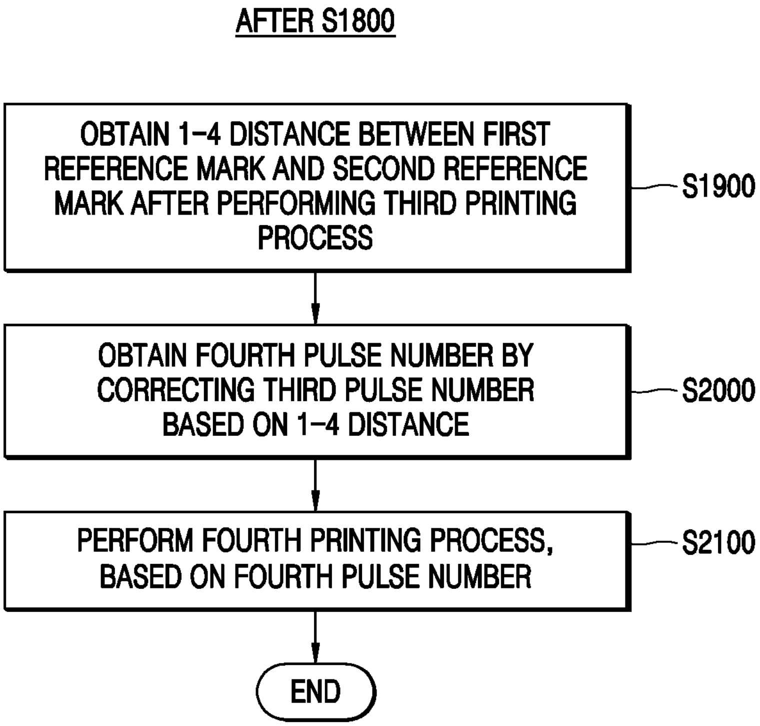
FIG. 12 is a flowchart schematically illustrating an addition of some processes after an operation of performing the third printing process based on the third pulse number.

FIG. 12 is a flowchart schematically illustrating addition of some processes after operation S1800 in the printing method of FIG. 11.

As shown in FIG. 12, the printing method may further include an operation S1900 of obtaining the 1-4 distance between the first reference mark M1 and the second reference mark M2 after performing the third printing process, an operation S2000 of obtaining the fourth pulse number by correcting the third pulse number based on the 1-4 distance, and an operation S2100 of performing the fourth printing process based on the fourth pulse number. As such, in the printing method according to another embodiment, a fifth printing process and an n-th printing process may be further performed, and a distance between reference marks may be corrected while each printing process is being performed.

The operation S1900 of obtaining the 1-4 distance between the first reference mark M1 and the second reference mark M2 after performing the third printing process may be an operation of obtaining a degree of deformation of the substrate 20 due to the heat of the discharge head unit 130 in prior printing processes. Due to the heat generated in the third printing process, the 1-3 distance may be changed to the 1-4 distance.

The fourth pulse number may increase to be greater than the third pulse number by a rate at which the 1-4 distance increases. The fourth pulse number may be increased to be greater than the third pulse number, based on the difference between the 1-3 distance and the 1-4 distance.

Operation S2000 of obtaining the fourth pulse number by correcting the third pulse number based on the 1-4 distance may be an operation of correcting the third pulse number based on the degree of a ratio between the 1-3 distance and the 1-4 distance. A description of operation S2000 of obtaining the fourth pulse number may be readily derived from the above description of the operation of obtaining the third pulse number, and thus will be omitted.

In operation S2100 of performing the fourth printing process based on the fourth pulse number, the discharge head unit 130 may be moved by the 1-4 distance, based on the fourth pulse number, during the fourth printing process.

Alternatively, in operation S2100 of performing the fourth printing process based on the fourth pulse number, the substrate 20 may be moved by the 1-4 distance during the fourth printing process, based on the fourth pulse number, or the location of the substrate 20 may be changed by the 1-4 distance. The movement of the discharge head unit 130 or the movement of the substrate 20 is due to differences in printing methods during a printing process and may be applied differently depending on the cases. Alternatively, in some cases, the discharge head unit 130 and the substrate 20 may move simultaneously in correspondence with the corrected 1-4 distance.

However, as the moving distance of the discharge head unit 130 increases, a cycle, which is a criterion for discharging the ink material from the discharge head unit 130, also needs to increase together.

For example, operation S2100 of performing the fourth printing process based on the fourth pulse number may include an operation of changing the location of the substrate 20, based on the difference between the 1-3 distance and the 1-4 distance, and an operation of controlling the discharge head unit 130 to discharge ink based on a fourth cycle corresponding to the fourth pulse number.

The operation of changing the location of the substrate 20 based on the difference between the 1-3 distance and the 1-4 distance may be driving the driving device 120 based on the obtained fourth pulse number and changing the location of the substrate 20 by the 1-4 distance by using the driving device 120 driven based on the fourth pulse number.

The operation of controlling the discharge head unit 130 to discharge ink based on the fourth cycle corresponding to the fourth pulse number is an operation of performing the fourth printing process, wherein the fourth printing process may be a process in which the ink material is discharged from the discharge head unit 130 at every repetition of the fourth cycle or one unit pattern or one pixel is printed at every repetition of the fourth cycle.

For example, operation S2100 of performing the fourth printing process, based on the fourth pulse number, may be an operation of correcting the third cycle to the fourth cycle, based on ratio information between the 1-3 distance and the 1-4 distance obtained in advance, and performing the fourth printing process, based on the corrected fourth cycle.

The fourth cycle may increase to be greater than the third cycle by a ratio between the 1-3 distance and the 1-4 distance. The fourth cycle may be increased to be greater than the third cycle, based on the difference between the 1-3 distance and the 1-4 distance.

A cycle being increased may refer to the same number of dots or pixels being printed at the 1-3 distance but a separation distance between the dots or pixels being increased.

Accordingly, the fourth printing process may be a process in which the ink material is discharged from the discharge head unit 130 at every repetition of the fourth cycle, or one unit pattern or one pixel is printed at every repetition of the fourth cycle.

Although up to the fourth printing process has been described for convenience of description, it may be clearly understood by those skilled in the art that an additional printing process may be performed and the above-described technical idea may be applied to the substrate 20 that expands due to heat generated during the additional printing process in the same or similar manner.

In addition, the location of the measurement device 200 may also be changed by heat generated during a printing process, and additional alignment marks may be placed to correct the location of the measurement device 200, as described above with reference to FIG. 6 and the like. Therefore, the printing method according to another embodiment may further include changing the location of the measurement device 200, based on alignment marks disposed on the upper surface of the driving stage 110 when the substrate 20 moves on the driving stage 110. The changing of the location of the measurement device 200 may be periodically performed during several printing processes.

According to an embodiment as described above, a printing system and a printing method capable of performing precise printing by reflecting thermal deformation of a substrate may be realized. Of course, the scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A printing system for printing on an upper surface of a substrate on which at least a first reference mark and a second reference mark spaced apart from the first reference mark are disposed, the printing system comprising:

a printing module configured to perform a plurality of printing process on the upper surface of the substrate, the printing processes including a first printing process that is based on a first pulse number;

a measurement device configured to obtain image data for the upper surface of the substrate before and after the first printing process; and a correction device configured to, based on the image data, obtain first distance change information change in a distance between the first reference mark and the second reference mark before and after the first printing process, change the first pulse number to a second pulse number, based on the first distance change information, and control the printing module to perform a second printing process of the plurality of printing processes performed on the upper surface of the substrate, the second printing process being based on the second pulse number.

2. The printing system of claim 1, wherein the printing module comprises:

a driving device that moves the substrate based on the first pulse number for the first printing process or the second pulse number for the second printing process; and a discharge head unit configured to discharge ink onto the upper surface of the substrate, discharge of the ink being based on a first cycle obtained based on the first pulse number or a second cycle obtained based on the second pulse number.

3. The printing system of claim 2, wherein the first distance change information is information about a difference between a 1-1 distance between the first reference mark and the second reference mark before the first printing process, and a 1-2 distance between the first reference mark and the second reference mark after the first printing process.

4. The printing system of claim 3, wherein the second pulse number is increased to be greater than the first pulse number in response to the 1-2 distance being greater than the 1-1 distance.

5. The printing system of claim 4, wherein the second cycle is longer than the first cycle, based on a difference between the first pulse number and the second pulse number.

6. The printing system of claim 1, wherein the first distance change information indicates a degree of deformation of the substrate due to heat generated in the first printing process.

7. The printing system of claim 1, wherein the correction device is further configured to obtain a 1-3 distance between the first reference mark and the second reference mark, after the second printing process, obtain a third pulse number by correcting the second pulse number based on the 1-3 distance, and control the printing module to perform a third printing process on the upper surface of the substrate based on the third pulse number.

8. The printing system of claim 7, wherein the correction device is further configured to obtain a 1-4 distance between the first reference mark and the second reference mark, after the third printing process, obtain a fourth pulse number by correcting the third pulse number based on the 1-4 distance, and control the printing module to perform a fourth printing process on the upper surface of the substrate based on the fourth pulse number.

9. A printing method comprising:

obtaining a 1-1 distance between a first reference mark and a second reference mark disposed on an upper surface of a substrate;

performing a first printing process based on a first pulse number corresponding to the 1-1 distance;

obtaining a 1-2 distance between the first reference mark and the second reference mark after the first printing process;

obtaining a second pulse number by correcting the first pulse number based on the 1-1 distance and the 1-2 distance; and performing a second printing process based on the second pulse number.

10. The printing method of claim 9, wherein the performing of the first printing process comprises controlling a discharge head unit to discharge ink, based on a first cycle corresponding to the first pulse number.

11. The printing method of claim 10, wherein the performing of the second printing process comprises:

changing a location of the substrate, based on a difference between the 1-1 distance and the 1-2 distance; and controlling a discharge head unit to discharge ink, based on a second cycle corresponding to the second pulse number.

12. The printing method of claim 11, wherein the second pulse number is increased to be greater than the first pulse number, based on a difference between the 1-1 distance and the 1-2 distance.

13. The printing method of claim 12, wherein the second cycle is longer than the first cycle, based on a difference between the first pulse number and the second pulse number.

14. The printing method of claim 9, further comprising:

obtaining a 2-1 distance between a third reference mark and the first reference mark disposed on the upper surface of the substrate before the first printing process; and obtaining a 2-2 distance between the third reference mark and the first reference mark after the first printing process.

15. The printing method of claim 14, wherein the performing of the second printing process comprises, based on a difference between the 2-1 distance and the 2-2 distance, controlling a nozzle from which ink is discharged among a plurality of nozzles included in the discharge head unit.

16. The printing method of claim 9, wherein the difference between the 1-1 distance and the 1-2 distance is proportional to a degree of deformation of the substrate due to heat generated in the first printing process.

17. The printing method of claim 9, further comprising:

obtaining a 1-3 distance between the first reference mark and the second reference mark after the second printing process;

obtaining a third pulse number by correcting the second pulse number based on the 1-3 distance; and performing a third printing process based on the third pulse number.

18. The printing method of claim 17, further comprising:

obtaining a 1-4 distance between the first reference mark and the second reference mark after the third printing process;

obtaining a fourth pulse number by correcting the third pulse number based on the 1-4 distance; and performing a fourth printing process based on the fourth pulse number.

19. The printing method of claim 9, wherein the 1-1 distance or the 1-2 distance is obtained based on image data obtained by a measurement device.

20. The printing method of claim 19, further comprising changing a location of the measurement device based on an alignment mark disposed on an upper surface of a driving stage when the substrate moves on the driving stage.

* * * * *